United States Patent
Steins et al.

(10) Patent No.: US 8,165,805 B2
(45) Date of Patent: Apr. 24, 2012

(54) SYSTEM AND METHOD FOR MARKING A REGION OF A ROAD MAP DISPLAYED BY A VEHICLE NAVIGATION SYSTEM

(75) Inventors: Wilfried Steins, Ismaning (DE); Bernd Biechele, Munich (DE); Marcello Tava, Munich (DE); Uwe Koch, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 991 days.

(21) Appl. No.: 11/942,161

(22) Filed: Nov. 19, 2007

(65) Prior Publication Data

US 2008/0147318 A1 Jun. 19, 2008

(30) Foreign Application Priority Data

Nov. 24, 2006 (DE) .................. 10 2006 049 303

(51) Int. Cl.
*G01C 21/26* (2006.01)
*G01C 21/30* (2006.01)

(52) U.S. Cl. ........ 701/435; 701/408; 701/425; 701/532; 345/184; 715/702

(58) Field of Classification Search ............ 701/211
See application file for complete search history.

(56) References Cited

U.S. PATENT DOCUMENTS

| | | | | |
|---|---|---|---|---|
| 5,243,528 A * | 9/1993 | Lefebvre | ........... | 701/211 |
| 5,270,689 A | 12/1993 | Hermann | | |
| 6,487,305 B2 * | 11/2002 | Kambe et al. | ........... | 382/113 |
| 6,542,812 B1 * | 4/2003 | Obradovich et al. | ........... | 701/207 |
| 6,856,901 B2 * | 2/2005 | Han | ........... | 701/211 |
| 6,882,931 B2 * | 4/2005 | Inoue | ........... | 701/201 |
| 7,643,017 B2 * | 1/2010 | Lai et al. | ........... | 345/184 |
| 7,945,383 B2 * | 5/2011 | Tu et al. | ........... | 701/202 |
| 2003/0233191 A1 * | 12/2003 | Hosoe | ........... | 701/208 |
| 2004/0060807 A1 * | 4/2004 | Nishimoto et al. | ........... | 200/553 |
| 2005/0131643 A1 * | 6/2005 | Shaffer et al. | ........... | 701/210 |
| 2005/0251327 A1 * | 11/2005 | Ogasawara et al. | ........... | 701/200 |
| 2005/0284737 A1 * | 12/2005 | Shitanaka et al. | ........... | 200/5 R |
| 2006/0256090 A1 * | 11/2006 | Huppi | ........... | 345/173 |
| 2007/0150179 A1 * | 6/2007 | Pinkus et al. | ........... | 701/208 |
| 2007/0239354 A1 * | 10/2007 | Kwon | ........... | 701/210 |
| 2008/0068354 A1 * | 3/2008 | Aimi et al. | ........... | 345/184 |
| 2008/0249701 A1 * | 10/2008 | Zhuang | ........... | 701/200 |

FOREIGN PATENT DOCUMENTS

DE  38 36 555 A1  5/1990
DE  197 52 056 A1  5/1999

OTHER PUBLICATIONS

Storage and Topology in the Redesigned MAF/TIGER—US Census Bureau, retrieved from www.census.gov/geo/mtep_obj2/topo_and_data_stor.html; Mar. 2005.*

* cited by examiner

*Primary Examiner* — Thomas Black
*Assistant Examiner* — Lin B Olsen
(74) *Attorney, Agent, or Firm* — Crowell & Moring LLP

(57) ABSTRACT

In the case of a system for marking a region within an image of a road map detail displayed on a vehicle video screen, a regional location can first be selected by a control element. The region, which represents one of several administrative levels, can be constantly fixed via an enter function of the control element. The administrative level and thereby the size of the region can be changed by a rotational movement of the control element, which can be rotated about a longitudinal axis.

15 Claims, 1 Drawing Sheet

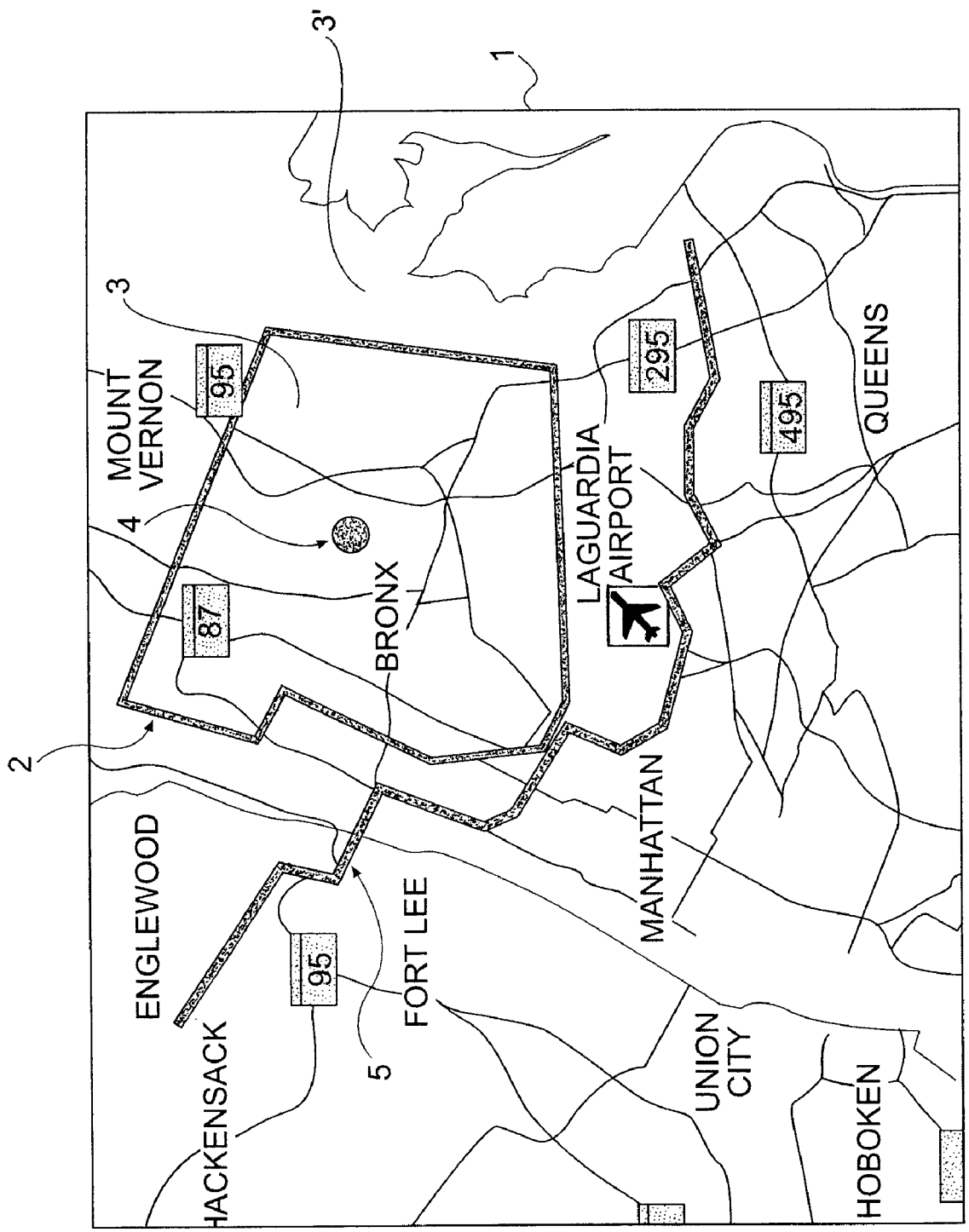

SYSTEM AND METHOD FOR MARKING A REGION OF A ROAD MAP DISPLAYED BY A VEHICLE NAVIGATION SYSTEM

BACKGROUND AND SUMMARY OF THE INVENTION

The invention relates to a system for marking a region within an image of a road map detail displayed on a vehicle video screen. Such systems are used in vehicle navigation systems. The navigation system automatically computes the optimal driving route for the respective location of the vehicle based on knowledge of the destination and, by way of corresponding visual and/or acoustic indications, provides assistance to the driver for driving to the destination without the use of conventional map material. The marking of a region causes the navigation system to drive around that region.

In this context, it is known from U.S. Pat. No. 6,542,812 to mark the region by use of a suitable drawing device so that the drive takes place around the marked outlines. It is easy to recognize that such a system is not particularly suitable for use in comfort-optimized vehicles.

Furthermore, a correction possibility can be provided only very inconveniently, if at all. In this case, a correction is also a change of the displayed map detail with respect to its size as well as also with respect to its position.

Required long periods of looking at the system and for operating the system are also a disadvantage associated with the known system.

It is an object of the invention to provide a system of the above-mentioned type, by which a marking of a region within a road map detail displayed on a vehicle video screen becomes possible in an easy and rapid manner.

According to the invention, a system is provided for marking a region within an image of a road map detail displayed on a vehicle video screen, characterized in that a location of the region can first be selected by a control element. The region can be constantly fixed by way of an enter function. The region represents one of several administrative levels, and the administrative level and, thereby, the size of the region can be changed by a rotating movement of the control element, which can be rotated about a longitudinal axis.

The enter function fixes the selected region. As a result of the movement of the control element, the size of the region is changed corresponding to the administrative levels controlling this region. An administrative level is the sequence of administrative units. In Germany, this is, for example, the succession of the nation, the land, the administrative district of the land, the county, the town, and the part of town. As a result of the enter function, the uppermost and the lowermost or the last authoritative administrative level is selected.

Advantageous embodiments of the invention are described herein. These embodiments relate to the possibility of changing the dimensions and/or the position of the region by use of the control element, to fixing an implemented selection, and to the manner of how this fixing can be carried out by use of the control element and can be included in the navigation system.

Finally, the inventive system provides a solution in the event that the vehicle is already situated within the marked region. In this case, the navigation system suggests a route by which the vehicle leaves this region as quickly as possible.

BRIEF DESCRIPTION OF THE DRAWING

The single FIGURE shows a road map displayed on a video screen and a region marked therein according to the invention.

DETAILED DESCRIPTION OF THE DRAWING

In the case of a navigation system for a vehicle (not shown in detail), a map detail is situated on a video screen 1. In addition, a region 3 bounded by a draft of a traverse 2, which is visually highlighted (marked), is situated within the video screen. This region is, for example, the administrative unit of the Borough of the Bronx of New York City.

By use of a manually operable, control element (not shown), the draft of the traverse 2 can be controlled with respect to its position and its size. The control element preferably is a push-turn button, as described in German Patent document DE 3836555 A1 (having counterpart U.S. Pat. No. 5,270,689). It can be rotated about its axis and can be moved longitudinally along its axis. As a rule, the longitudinal movement has the purpose of causing an "enter" function.

In addition, the control element can be moved translationally. This may be a tilting motion or a transverse motion similar to a stirring motion. A corresponding control element is known from German Patent document DE 197 52 056 A1.

Assuming that a driver wants to avoid a certain region, then by means of the transverse motion of the control element, the driver moves a pointer 4 within the marked region 3 in the map detail. If he exceeds the region 3 and moves into the adjacent region 3', this region is marked instead of region 3. Before, during or after this moving motion, the driver can enlarge or reduce the size of the region corresponding to the actual administrative levels by rotating the control element. In this example, these levels include the State of New York, the City of New York, the Boroughs of the Bronx, of Manhattan, etc., the Districts/Community Boards, and the Neighborhoods.

In the map detail, the resulting boundary 2 of the region 3, as required, is highlighted in color. If the driver has selected the marked region as desired, he only still has to trigger the enter function by axially moving the control element. The region is thereby fixed and fed into the navigation system (not shown). The navigation system will then define the driving route such that the driving takes place around the region. For example, the graphically highlighted driving route 5 is defined.

Should the vehicle be situated within the marked region when the enter function is triggered, the navigation system will indicate a driving route by which the vehicle may quickly leave the region (not shown).

In this manner, it becomes possible to manually intervene in the route selection of a navigation system in a reliable manner while looking at the system as little as possible. The entire manipulation takes place by use of a single control element without a time-consuming change of operating elements.

The invention claimed is:
1. A system for marking a region of a road map displayed on a vehicle display, the system comprising:
a control element rotatable about its longitudinal axis and is further operatively configured to provide an axial movement along the longitudinal axis;
wherein a location for the region to be marked on the vehicle display is selected via the control element, the region being fixed by way of an enter function that is triggerable via the axial movement of the control element; and wherein the region corresponds to one of a plurality of administrative levels, wherein the plurality of administrative levels correspond to a plurality of differently-sized geographic areas that are defined according to an authority which exercises control over corresponding ones of the plurality of differently-sized geographic areas; and wherein a currently-selected administrative level of the plurality of administrative levels, and correspondingly a size of a geographic area corresponding to the region, is changeable via the rotational movement of the control element.

2. The system according to claim 1, wherein the rotational movement of the control element includes lock-in positions, wherein the currently-selected administrative level is changeable in steps corresponding to the lock-in positions.

3. The system according to claim 2, wherein the control element is movable transversely with respect to the longitudinal axis, and wherein via the transverse movement of the control element, rather than the region being markable, an adjacent region becomes markable, the adjacent region being determined via a direction of the transverse movement of the control element.

4. The system according to claim 2, wherein via the enter function, the system provides the marked region to an assigned navigation system of the vehicle, wherein the navigation system provides a navigation route that avoids the marked region.

5. The system according to claim 1, wherein the control element is movable transversely with respect to the longitudinal axis, and wherein via the transverse movement of the control element, rather than the region being markable, an adjacent region becomes markable, the adjacent region being determined via a direction of the transverse movement of the control element.

6. The system according to claim 5, wherein via the enter function, the system provides the marked region to an assigned navigation system of the vehicle, wherein the navigation system provides a navigation route that avoids the marked region.

7. The system according to claim 1, wherein via the enter function, the system provides the marked region to an assigned navigation system of the vehicle, wherein the navigation system provides a navigation route that avoids the marked region.

8. The system according to claim 7, wherein via the enter function, a driving route for exiting the marked region is one of provided and selected when a current location of the vehicle is within the marked region.

9. The system according to claim 1, wherein the marked region is provided to a navigation system of the vehicle via the enter function, and wherein a driving route for exiting the marked region is one of provided and selected by the navigation system when a current location of the vehicle is determined by the navigation system to be within the marked region.

10. The system according to claim 1, wherein the plurality of differently-sized geographic areas comprises at least state, city and town.

11. A method of operating a vehicle navigation system having a display and a control element, the control element being rotatable about a longitudinal axis and movable axially along the longitudinal axis, the method comprising the acts of:

displaying a road map on the display;

selecting a region of the displayed road map using the control element, wherein the selected region corresponds with one of a plurality of administrative levels associated with the displayed road map, wherein the plurality of administrative levels correspond to a plurality of differently-sized geographic areas that are defined according to an authority which exercises control over corresponding ones of the plurality of differently-sized geographic areas; and changing a currently-selected administrative level of the plurality of administrative levels, and correspondingly a size of a geographic area corresponding to the selected region, via rotational movement of the control element.

12. The method according to claim 11, further comprising the act of generating a driving route via the navigation system which avoids the selected region.

13. The method according to claim 12, further comprising the act of utilizing a transverse movement of the control element relative to the longitudinal axis to select an adjacent region on the display, rather than the region.

14. The method according to claim 12, wherein when the navigation system determines the vehicle to be within the selected region, generating a driving route for exiting the selected region.

15. The method according to claim 11, wherein the plurality of differently-sized geographic areas comprises at least state, city and town.

* * * * *